United States Patent
Williams

[11] 3,787,078
[45] Jan. 22, 1974

[54] MANHOLE BASE SECTION FOR SEWER LINES

[76] Inventor: Richard L. Williams, Rt. No. 1, Harrod, Ohio 45850

[22] Filed: Aug. 3, 1972

[21] Appl. No.: 277,558

[52] U.S. Cl. .................. 285/189, 285/231, 52/21
[51] Int. Cl. ............................................. F16l 39/04
[58] Field of Search .... 285/189, 231, 234; 137/363; 52/19, 20, 21

[56] References Cited
UNITED STATES PATENTS

| | | | |
|---|---|---|---|
| 3,212,519 | 10/1965 | Paschen | 137/363 |
| 2,265,615 | 12/1941 | Stalter | 285/231 |
| 2,999,699 | 9/1961 | Lafferti | 285/230 |
| 821,675 | 5/1906 | Shaw | 52/20 |
| 2,451,070 | 10/1948 | Chamberlain | 285/231 |
| 2,032,492 | 3/1936 | Nathan | 285/231 |
| 3,348,850 | 10/1967 | Scales | 285/230 |

Primary Examiner—Reinaldo P. Machado
Attorney, Agent, or Firm—Malcolm W. Fraser, Esq.

[57] ABSTRACT

A manhole base section for sewer lines having reinforcing sections on the inside of the base section at opposite ends of the flow channel. Each reinforcing section is of substantial thickness, but the outer side conforms to the outer side of the base section. In each reinforcing section is an inwardly tapered hole aligned with the channel. The sewer pipe for each tapered hole has on its inner end an elastomeric band equipped with tongue-like resilient flexible flanges, which, when crowded into a tapered hole, provide a fluid-tight seal and enable deflection or tilting of the sewer pipe to a limited extent in any direction.

1 Claim, 5 Drawing Figures

MANHOLE BASE SECTION FOR SEWER LINES

SUMMARY OF THE INVENTION

A manhole base section for sewer lines is interposed between sewer pipes, which must be connected thereto in a liquid-tight manner. Ordinarily, this is achieved at a relatively high cost and requires considerable time and effort. In this instance, this is accomplished quickly and at minimum expense. An important feature resides in the ability to tilt or deflect one or the other sewer pipes without destroying the liquid-tight connections with the base section. Consequently, not only is ease of installation effected, but a simple sealing device is provided which makes possible deflection within a limited extent.

PREFERRED EMBODIMENT OF THE INVENTION

Figure 1:
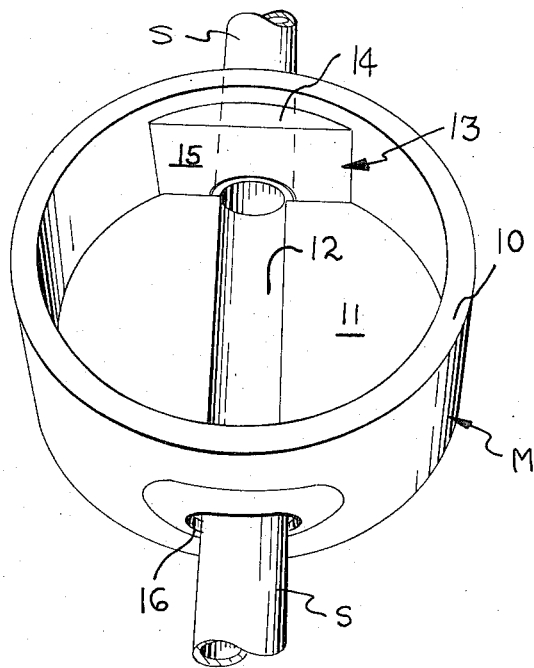
FIG. 1 is a top perspective view of a manhole base section for sewer lines, showing sewer pipes in position.

Referring to the drawings, there is shown a manhole sewer base section M which is usually of concrete and has a substantial wall thickness. It consists, as shown, of a tubular side wall form 10, which, as shown, is cylindrical, both on the inside and outside and is provided with an integral flat imperforate bottom wall 11. Extending diametrically across the bottom wall on the inside is a relatively shallow U-shaped curved channel 12 establishing the flow line for sewage through the base section. If desired, the upper edge portion of the side wall form 10 may be stepped for the reception and mounting of a superposed tubular section, this being well being well known in the art and not illustrated on the drawings.

At opposite sides of the sewer base section M, and in alignment with the ends of the flow line channel 12, are cylindrical passages or ducts for the reception of sewer pipes S which establish the sewer line, the inside diameter of these pipes aligning with the channel 12 to afford a free uninterrupted flow. Ordinarily, the sewer pipes S are also concrete and are plain ended, but they may, if desired, be of polyvinyl chloride, vitrefied clay or the like.

Figure 2:
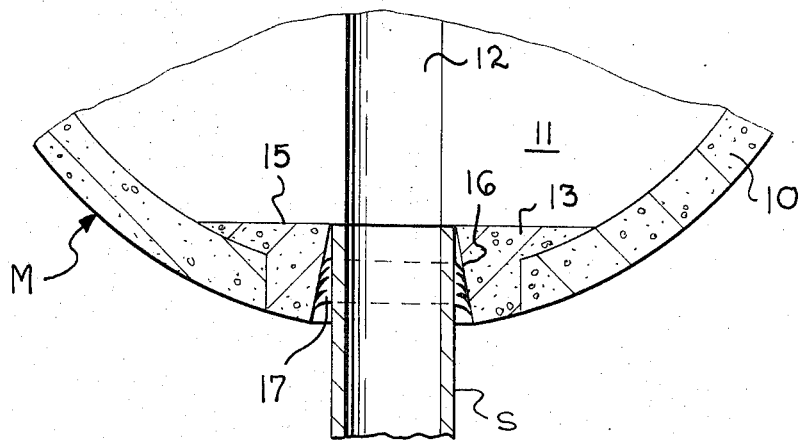
FIG. 2 is a fragmentary enlarged sectional view of the base section showing a reinforcing section with a sewer pipe mounted therein.

In practice, a relatively large hole is made in the opposite sides of the tubular side wall form 10 at the ends respectively of the channel 12. Fitting this hole and also formed of concrete or the like is a reinforcing section 13. The section 13 is cast on the inside of the base section M and extends from the floor or bottom wall 11 nearly three-fourths of the depth of the side wall form 10. At the top of the section 13 is a flat shelf 14 and the inner wall 15 is flat and chord-like in appearance. The reinforcing section extends uniformly on opposite sides of the channel 12 for a substantial distance to afford a relatively thick and sturdy reinforcement. The outer side of the section 13, as indicated on FIG. 2, mergers into the outer side of the tubular form 10 and conforms to the shape and contour thereof.

Figure 3:
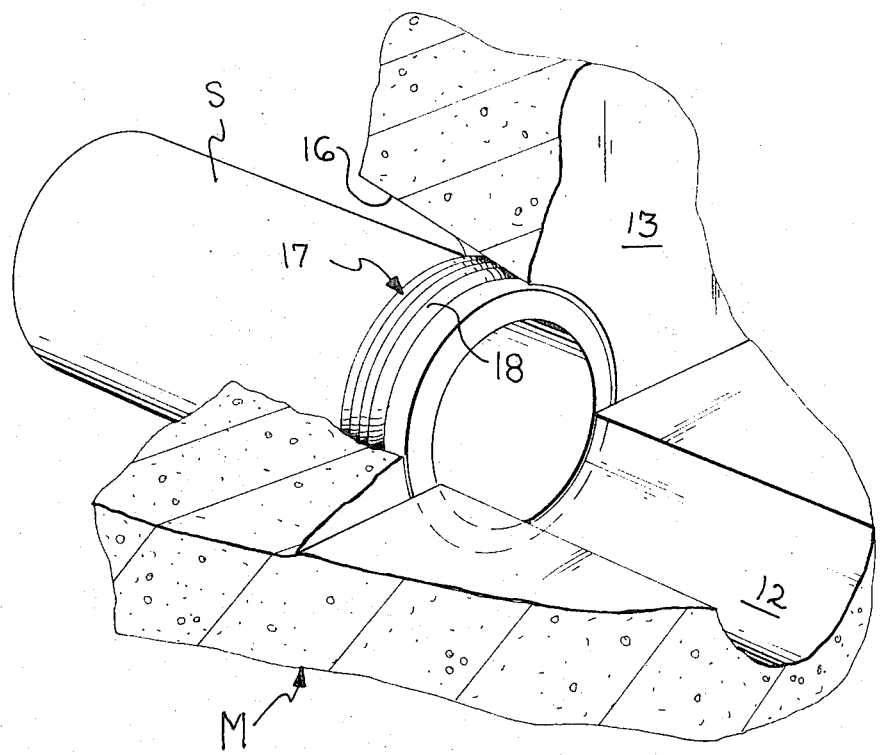
FIG. 3 is an enlarged fragmentary sectional view showing the tapered hole in the reinforcing section and the elastomeric sealing ring.

Extending through each reinforcing section 13 is a passage or duct 16 which leads to the adjacent end of the channel 12 and is aligned therewith. The inner end of such passage 16 leads to the channel 12 and the wall of the passage at this location is spaced from the channel 12 approximately the thickness of the sewer pipe S which is intended for same. As best shown on FIGS. 2 and 3, the duct 16 tapers inwardly from the outer end, the degree of taper being not critical, but is such as to enable limited tilting or deflecting of the respective sewer pipe S in any direction. This obviates the necessity of the two sewer pipes S being precisely in alignment with each other and compensates for irregularities in ground conditions and the like.

Figures 4, 5:
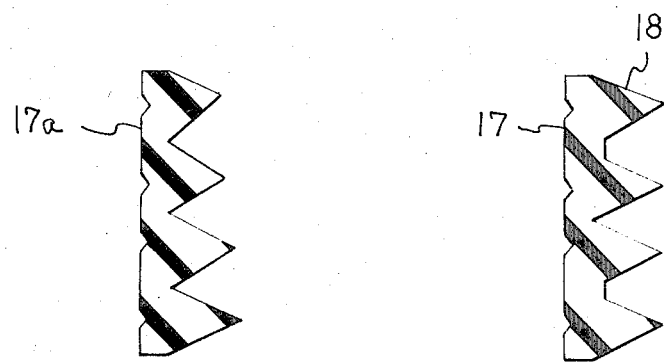
FIG. 4 is an enlarged sectional view of a sealing ring, the contour of which is cylindrical and of the same diameter throughout its length.
FIG. 5 is an elarged sectional view of an alternate form of sealing ring, the contour of which is tapered similar to that of the holes in the reinforcing section of the manhole base section.

It is important that an effective liquid-tight seal be secured between each sewer pipe and the walls of the respective tapered passage 16. For this purpose, an elastomeric sealing ring or band 17 of rubber of the like snugly fits around the end portion of each sewer pipe S. It should be closer to the end of the pipe, but its exact location is not critical due to the fact that the passage 16 is a tapered one. The ring or band 17, as shown in FIG. 4, consists of a body portion from which radiate outwardly a plurality of tapered tongue-like flanges, which are of uniform diameter. When each sewer pipe S, equipped with a band 17, is crowded into the tapered passage 16, the flanges deflect intimately to engage the walls of the passage and provide the desired seal, even though the pipe is slightly tilted in one direction or another.

Instead of the band 17 being of uniform diameter throughout, the band 17a, shown on FIG. 5, has the tongue-like flanges of tapered form, that is the outside contour of the band is tapered in conformity generally with the taper of the passage 16.

From the above description, it will be manifest that the reinforcing sections 13 not only add substantial strength and body to the base section, but also make possible tapered passage or ducts for the sewer pipes S. These ducts are of substantial length and are tapered so as to enable the sewer pipes to be tilted or deflected in any desired direction to a limited extent. The elastomeric band or ring affords an effitive liquid-tight seal between the parts. A particularly desirable feature of the assembly is its simplicity, reducing the cost to a minimum, and enabling installation readily and easily. By the use of the reinforcing section, larger diameter sewer pipes S can be used with smaller diameter base sections. This is because the reinforcing section affords greater area to afford the sewer pipe receiving passage than the curvature of the base section would ordinarily afford.

Another important advantage of the reinforcing section 13 as above described, is that initially the base section may be cast leaving holes on opposite sides to receive the sections 13. Then, when one or more base sections are required on the job, the reinforcing sections 13 are then added with tapered holes 16 of the proper size for the intended sewer pipe S. It will be understood that sewer pipes S vary from 8 to 24 inches in diameter, depending upon the demand of service.

What I claim is:

1. A manhole base section for sewer lines comprising in combination a tubular form of concrete or the like having a side wall of generally uniform thickness and an imperforate flat bottom wall provided with a U-shaped flow channel for guiding effluent therethrough, an integral reinforcing section of concrete or the like adjacent said bottom wall and at each end of said channel of substantial thickness and extending chord-like across the interior of said tubular form on opposite sides of the respective channel end and outwards toward the open end of said form for greatly enlarging the thickness of said form in the area of each reinforcing section, the outer side of each reinforcing section conforming to the outer side of the tubular form thereby to provide a relatively smooth exterior for said form, there being a lateral passage through each reinforcing section open on the outer end and tapering inwardly to an opening on the inner end of a size approximately equal to the outside diameter of the sewer pipe intended to connect in the respective reinforcing section, the wall at the inner end of each passage being spaced from said channel approximately the thickness of the sewer pipe intended for same, thereby to provide an uninterrupted connection, a plain end sewer pipe of concrete or the like for connection in each of the tapered passages of said reinforcing sections, an elastomeric band snugly fitting the inner end portion of each sewer pipe, and means on said band adapted when crowded into one of said tapered passages to provide a liquid-tight seal between the sewer pipe and the respective tapered passage and to afford limited tilting of the sewer pipe in any direction with respect to said tubular form.

* * * * *